Oct. 6, 1936.					C. HERZOG					2,056,398
							SEALING WELDER
							Filed July 27, 1935				2 Sheets-Sheet 1

INVENTOR
CARL HERZOG
BY Charles McClair
ATTORNEY

Oct. 6, 1936.  C. HERZOG  2,056,398
SEALING WELDER
Filed July 27, 1935   2 Sheets-Sheet 2
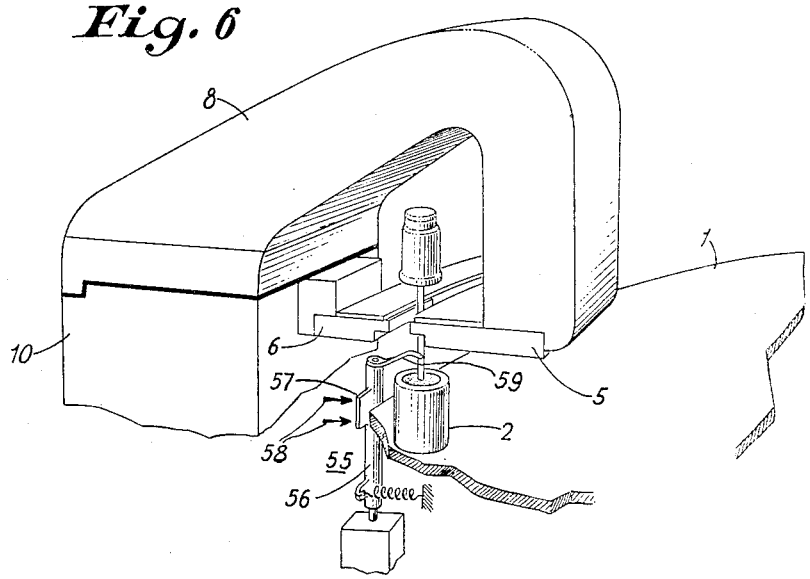
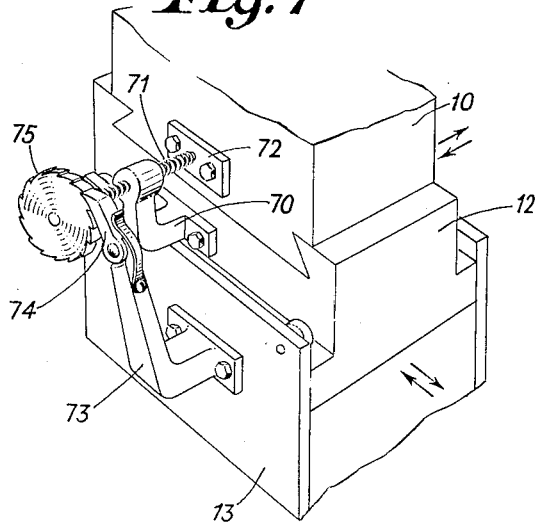
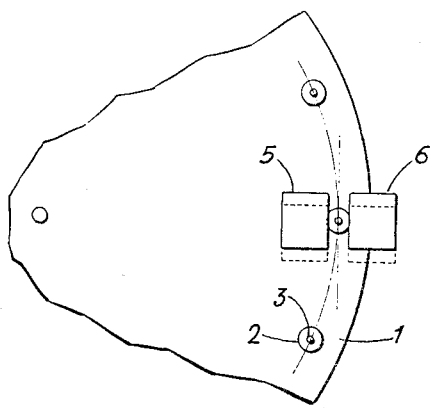
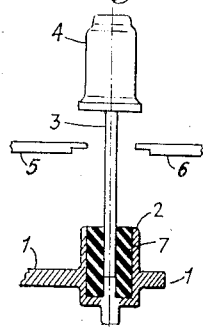
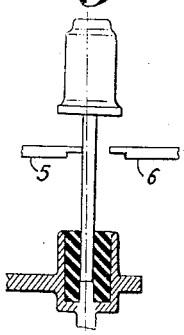
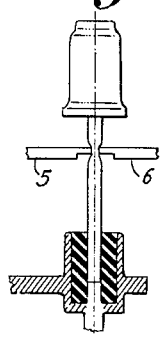
INVENTOR
CARL HERZOG
BY Charles McClaw
ATTORNEY Patented Oct. 6, 1936

2,056,398

UNITED STATES PATENT OFFICE 2,056,398

SEALING WELDER

Carl Herzog, Belleville, N. J., assignor, by mesne assignments, to Radio Corporation of America, New York, N. Y., a corporation of Delaware Application July 27, 1935, Serial No. 33,505

10 Claims. (Cl. 219—4)

My invention relates to a method and apparatus for sealing metal tubes air tight, and more particularly to sealing gas tight exhaust tubes for containers such as bulbs for lamps or electron discharge devices.

Evacuated devices having metal exhaust tubes have been sealed by hand operated welding jaws which compressed the sides of the tube and then welded them together. With this method the sealing is slow and tedious, and may result in defective seals, since insufficient pressure by the welding jaws, or premature application of welding current may cause oxidation of the inner wall of the exhaust tube and an imperfect seal.

The principal object of my invention is to provide an improved method and a simple apparatus by which a metal tube may be easily and efficiently sealed by welding. It is a further object of my invention to provide a machine which will fully compress and effectively seal exhaust tubes of evacuated envelopes such as bulbs of lamps or of electron discharge devices.

In accordance with my invention a vacuum tube or similar device having a metal exhaust tube is moved along a predetermined path, being exhausted during part of its travel and then brought into sealing off position with the metal exhaust tube in registry with a welding mechanism. Preferably the vacuum tubes are mounted in exhaust heads on the periphery of a rotating table which carries the vacuum tube step by step along a circular path during the heat treating and exhausting operations. During part of the revolution of the table, the vacuum tube is connected to the exhaust pumps, and then is positioned with the exhaust tube between a pair of welding electrodes which close the tube by pinching and then weld it at the pinch. The faces of the welding electrodes of my improved device are positioned in registry and preferably parallel to a line tangent to the circular path of the exhaust tube at the sealing position. The inner welding electrode, positioned inside the arcuate or circular path of travel of the exhaust tube, is moved radially outwards to bear lightly against the exhaust tube near its upper end, and the outer electrode is moved inward to pinch the tube between the two welding electrodes. While the welding electrodes are in this position, a switch operatively connected to the table rotating mechanism is closed to send a welding current thru the electrodes. The welding electrodes are then separated and the sealed tube moves into the next indexing position. In some cases a slight reduction in the pressure of the welding electrodes before the welding current is applied has been found desirable.

The novel features which I believe to be characteristic of my invention are set forth with particularity in the appended claims, but the invention will best be understood by reference to the following description in connection with the accompanying drawings in which:

Figure 2 is a plan showing the geometric relation of my welding electrodes and exhaust machine;

Figure 1:
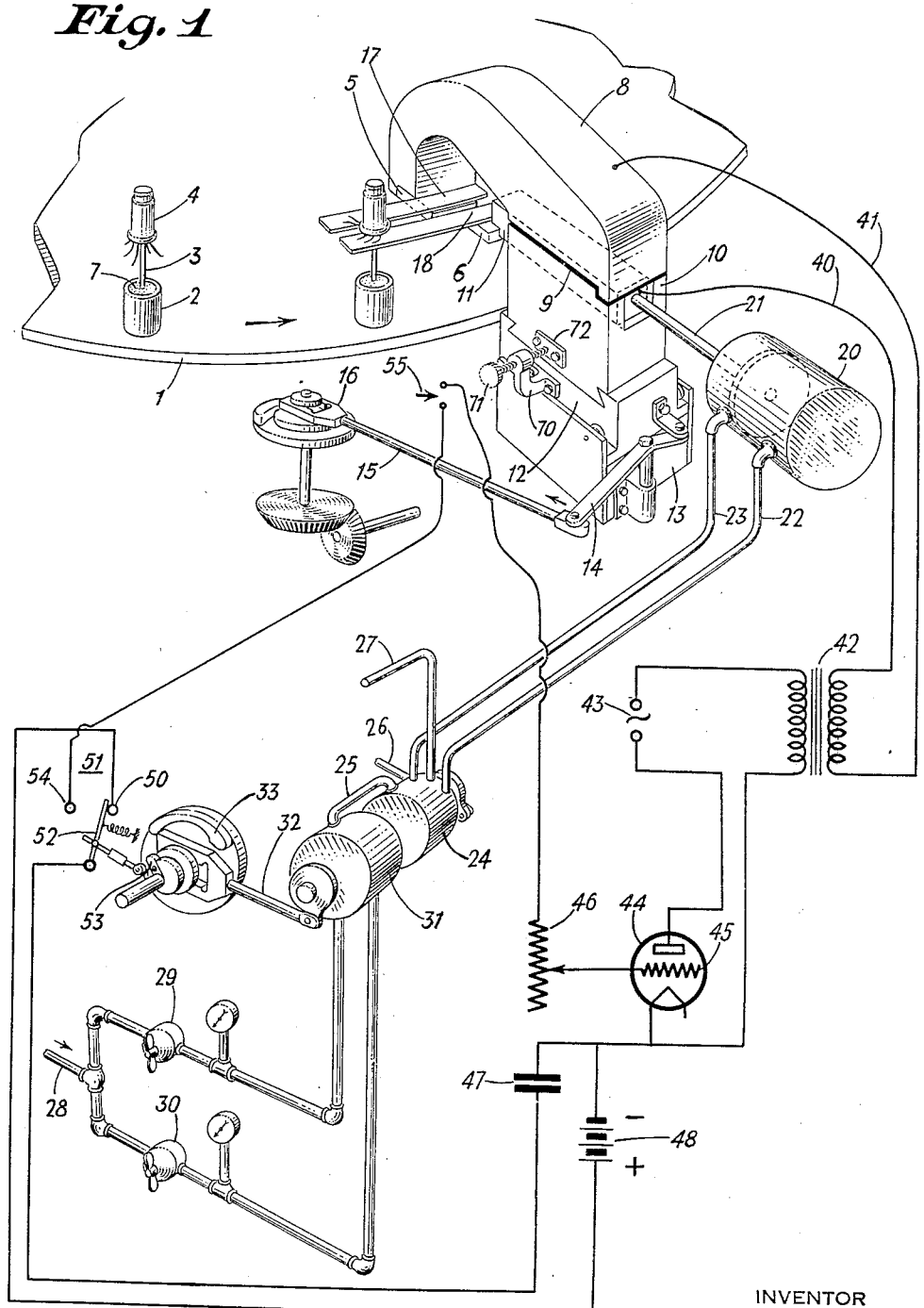
Figure 1 is a representation in perspective of a welder constructed in accordance with my invention with examples of cam, air and electrical connections.

Figures 3, 4, and 5 show respectively three fundamental steps in the operation of my device, Figure 6 is a detailed perspective view of my improved welding head and safety switch, and Figure 7 is a detailed perspective view of a ratchet cross-feed mechanism.

The usual automatic exhaust machine for evacuating and sealing lamps, audions or electron discharge devices consists of a round table or carriage, such as shown at 1, Figure 1, pivotably supported upon a fixed frame or stand to rotate in a horizontal plane. Uniformly spaced around the periphery of the table are a plurality of exhaust heads 2 to engage gas tight the lower end of exhaust tubes 3 of the bulbs 4 of the discharge devices, and to hold the exhaust tubes in an upright position. The table is power driven to cause it to move step-by-step and carry the bulbs past spaced gas flames or other apparatus for heat treating the bulb as the exhaust pumps, connected to the exhaust head, evacuate the bulb.

To seal the metal exhaust tube gas tight in accordance with my invention the exhaust tube is closed between two welding electrodes 5 and 6. The relatively movable welding electrodes may be mounted in various ways to close upon the exhaust tube, and may conveniently be mounted to reciprocate in alignment, and preferably to be bodily movable radially with their faces in registry and parallel to a tangent to the arcuate line of travel of the exhaust tube. As shown in plan view in Figure 2, the electrodes 5 and 6 are normally separated and displaced inwardly and outwardly to clear the line of travel of the moving exhaust tube. To pinch and weld the exhaust tube the electrodes 5 and 6 are brought together preferably in the sequence shown in Figures 3, 4, and 5.

In Figure 3 the exhaust tube 3 of an exhausted device is shown standing between the welding electrodes, it being assumed the path of travel of the tube is normal to the face of the drawing with the center of rotation of the table carrying exhaust head 2 to the left of the exhaust head. The exhaust head may be of the conventional type comprising a metal jacket with a tubular rubber nipple 7 to engage gas tight the lower end of the exhaust tube. While the exhaust tube is standing in this position between the welding electrodes, the sealing begins by a movement of the inner electrode 5 radially outward, or to the right, as shown in Figure 4, to bring the electrode close to the exhaust tube just below the bottom of the bulb. If desired, the electrode may tilt the tube in nipple 7 slightly until the face of the inner electrode comes to rest a distance from the normal center line of the exhaust tube equal to the thickness of the metal stock in the exhaust tube. The sealing is continued by the movement of the outer electrode 6 inwardly to pinch the exhaust tube, as shown in Figure 5. With some types of exhaust tubes it is found desirable to reduce the electrode pressure slightly and then welding current is passed thru the pinched portion of the exhaust tube by switching means operated in consonance with the exhaust machine. The welding electrodes then withdraw to normal position releasing the exhaust tube, and the exhaust head with its sealed exhaust tube then moves on to another indexing position where the exhaust tube may be removed from the rubber nipple.

The electrodes are moved radially inward and outward by mechanism more fully shown in Figure 1. The inner electrode 5 is carried on the depending end of yoke 8, preferably of metal casting, which rests upon insulating spacer 9 and is secured to block 10 by suitably insulated bolts (not shown), while outer electrode 6 is secured to the inner end of plunger 11 reciprocatably mounted in block 10. Block 10 is carried by carriage 12, slidably mounted in a guide way, on base 13. Bodily movement of the carriage 12 and its welding head structure may by way of example be effected by the reciprocating driving force of lever 14, arm 15 and cam 16. To prevent short circuiting between the electrodes by the lead-in wires extending from the bottom of the bulb, insulating guard plates 17 and 18 may be mounted on the upper surface of each of welding electrodes 5 and 6, and may, if desired, extend beyond the electrodes in the direction of travel of the exhaust head.

The mechanism just described is so adjusted in operation that the cam mechanism 16 moves and retains electrode 5 in an innermost position during the approach from the left of exhaust tube 3. When the exhaust tube 3 comes to rest opposite the welding face of electrode 5, cam mechanism 16 draws arm 15 to the left and thru lever 14 moves carriage 12 and its supported electrode 5 to the right into engagement with the exhaust tube.

The outer welding electrode 6, carried upon plunger 11 slidably mounted in block 10, is reciprocated by any suitable actuating mechanism, preferably of the hydraulic type. In the particular mechanism shown, cylinder 20 mounted upon block 10 has a piston 21 to reciprocate the plunger 11. The electrode 6 is advanced toward the inner electrode by admitting fluid under pressure to the right hand end of cylinder 20 thru a conduit 22, and is retracted by admitting fluid under pressure to the opposite end of the cylinder thru conduit 23. A poppet valve 24 receives fluid under pressure from conduit 25 and thru the movement of rocker arm mechanism 26, selectively introduces the fluid into conduit 22 or 23. Fluid from either end of the cylinder may be exhausted at 27. Rocker arm 26 may be reciprocated from cam means driven from the power driving mechanism of the table.

In welding certain types of tubes, it has been found desirable to apply a lower pressure to the electrodes during welding than is necessary to pinch the tube, as the contacting surfaces of the inner walls of the exhaust tube when held together under pinching pressure offer insufficient electrical resistance to the welding current to heat the metal. Accordingly conduit 25 is selectively supplied with fluid under a lower welding pressure as well as fluid under pinching pressure. It has been found convenient to introduce fluid at 28 and thru two pressure regulating valves 29 and 30, adjusted respectively to the pinching and to the welding pressures, and feed it at the two pressures to poppet valve 31. Ports within valve 31 are arranged and so controlled by rocker arm mechanism 32 and cam means 33 as to selectively introduce fluid at a pressure regulated either by valve 29 or valve 30, into conduit 25 from which it is passed thru the ports of valve 24 to the cylinder.

The sequence of air driving operations after an exhaust tube moves into position comprise the introduction of air at a relatively high pressure into the right-hand end of cylinder 20. Piston 21 forcibly moves to the left to pinch the interposed exhaust tube. After the pinching operation, and with rocker arm 26 remaining stationary, rocker arm 32 moves to admit the fluid of lower pressure to the right hand end of the cylinder. At this lower pressure the welding circuit is closed. After the welding operation the exhaust ports in valve 24 are spaced to exhaust the fluid from pipe 22 and at the same time the inlet ports are opened to introduce into pipe 23 fluid under pressure to force piston 21 to the right, thus withdrawing the plunger 11 and its welding electrode 6.

The welding current circuits and their control are best shown in Figure 1. As shown in Figure 1 the supporting members for the electrodes 5 and 6 are electrically insulated at 9 and current leads 40 and 41 for the electrodes are connected respectively to the plunger 11 and yoke 8 and are coupled thru transformer 42 to alternating current source 43. Switching means between the source and the transformer may take any desired form, it having been found that gaseous discharge devices may function to control the relatively large welding currents. Grid controlled gas tube 44 is shown by way of example as one suitable form of switching means for controlling the flow of current to the welding electrodes. The anode-cathode discharge, which in the embodiment illustrated is in series with the current source 43, is conveniently controlled by a grid 45 in the path of the discharge. The tube shown is preferably of such a form that the discharge continues as long as the grid remains positive. Circuits for positively charging grid 45 include resistor 46, condenser 47 and direct current source 48 with its negative terminal connected to the cathode of the discharge device and the positive terminal connected to the contact 50 of switch 51. Switch arm 52 normally lies in contact with 50 to connect the D. C. source across condenser 47. When the welding circuit is to be closed as determined by the table rotating mechanism, cam 53 moves arm 52 into engagement with contact 54, thus connecting the positive side of the charged condenser to the grid 45 thru switch 55 and resistor 46. The positively charged grid 45 permits a discharge thru the tube as long as the grid is maintained sufficiently positive. The duration of discharge thru the tube may conveniently be controlled by adjusting the capacity of condenser 47 and for value of resistance 46. Resistance 46 has been shown as adjustable for controlling the time constant of the control circuit. Switch 55, shown in greater detail in Figure 6, is a safety switch and is closed only when an exhaust tube stands in position between the welding electrodes.

Assuming an exhaust tube to be in place with the safety switch closed and the welding electrodes in the pinching position shown in Figure 5, cam means 53 moves to close the contacts 52—54. With the contacts of switch 52—54 and the contacts of safety switch 55 closed, grid 45 starts a discharge thru gas tube 44 thus closing the circuit between source 40 and the primary winding of 42. Thus energized, transformer 42 sends a welding current of the order of several thousand amperes thru the welding electrodes, the current continuing to flow with the connections shown, until the potential of grid 45 drops below the igniting voltage of the tube.

The safety switch, shown in greater detail in Figure 6, comprises an upstanding shaft 56 journaled at its lower end as shown and spring biased to normally remove metallic contact plate 57 out of engagement with points 58 connected to switch 51 and resistor 46. Upon the upper end of journaled shaft 56 is secured an arm 59 extending out and over the line of travel of the exhaust head 2. If an exhaust head approaches the welding position without an upstanding exhaust tube, the spring retains the contacts of the switch in an open position, thus maintaining open circuited and inoperative the control line for the grid circuit of tube 44. If on the other hand welding head 5 approaches with an upstanding exhaust tube in place, switch arm 59 is moved forward, rotating contact plate 57 into circuit closing position with points 58, which as explained conditions the control circuits of the welder for welding.

The cycle of operation of a welder constructed in accordance with my invention is as follows: Immediately after exhaust tube 2 comes to rest between welding jaws 5 and 6 the entire structure mounted upon base 13 moves to the right under the driving force of lever 14 to bring the face of electrode 5 into contact with the side of metal exhaust tube. Then air is admitted under high pressure into conduit 22 after appropriate movements of rocker arm mechanism 26 and 32, to force piston 21 to the left to pinch closed the exhaust tube as shown in Figure 5. Further movement of rocker arm 32 admits air under a lower pressure thru valves 24 and 31 to relieve the pinching force on electrode 4 to some lower value. Next cam means 53 closes the contacts 52—54. The control circuit for the gas tube is now completely thru safety switch 55 for energizing the gas tubes and coupling source 43 with the windings of 42. A welding current of substantial amplitude is caused to flow from the secondary of transformer 47 thru the welding electrodes to fuse and seal the exhaust tube at its pinched portion. With the tube sealed air pressure is relieved from conduit 22 and introduced thru conduit 23 to the left hand end of the air cylinder to retract electrode 6. Finally lever 14 moves in a counterclockwise direction to displace inner electrode 5 to the left or inwardly. Table driving mechanism is so timed as to then step the table into its next indexing position, moving the succeeding exhaust head with its upstanding exhaust tube into position between the electrode.

To minimize uneven wear and pitting of the electrodes, it has been found desirable in practice to laterally adjust the electrodes with respect to the exhaust tubes, and to utilize the entire welding surfaces of the electrodes. They may be adjustable to the dotted line positions shown in Figure 2. This relative adjustment may be conveniently made by transversely moving block 10 upon carriage 12, Figure 1. A bracket 70 is bolted to carriage 12 and carries thru its upstanding end a thumb screw 71 journaled at its end in a plate 72 upon block 10.

Lateral adjustment of the welding electrodes with respect to the exhaust tube may be conveniently made by automatic means shown in Figure 7. A bracket 73 is shown secured to stationary base 13 and provided at its upper end with a pawl 74. Screw 71 is attached at its outer end to a ratchet 75. For each reciprocation of carriage 12 over base 13, pawl 74 engages one or more teeth of the ratchet to rotate screw 71 and move transversely block 17 with the superposed welding head structure, thus presenting new surfaces of the welding electrode faces to each succeeding exhaust tube.

While I have shown one specific form of welding head with specific examples of cam actuating mechanisms, electric circuits and tube pinching mechanism, it is to be understood of course that many modifications may be made in my device without departing from the spirit or scope of my invention. Further, pinching pressures, welding pressures, and circuit parameters may vary for different exhaust tubes and working conditions. For example in the sealing off of one electron discharge device with a soft steel exhaust tube of .020" wall thickness and an outside diameter of .125", gas tight seals were obtained with a pinching pressure of at least 500 lbs. between the welding electrodes, a welding pressure of between 400 and 450 lbs. and a welding current of several thousand amperes flowing for 2 or 3 cycles from a 60 cycle per second source. While the maximum welding electrode pressure may be determined in some types of tubes by the electrical resistance between the contacting walls of the finished tube, a limit on the other hand is fixed for the minimum electrode pressure during welding. It is applicant's belief that the welding pressure between the electrodes must be high enough to cause the electrodes to follow the metal of the exhaust tube as it becomes plastic and flows or fuses together.

I claim:

1. In the art of sealing metal tubing, the method which comprises applying sufficient mechanical pressure to opposite sides of the tube to flatten the tube and bring its walls into contact, reducing said mechanical pressure, and welding the contacted portion of said walls by passing a welding current transversely thru them.

2. In the art of sealing metal tubes the method which comprises moving the tube in an arcuate path about a fixed center into position between two spaced welding electrodes, moving one electrode radially outward into contact with said tube, moving the other welding electrode radially inward under a predetermined pressure to compress a portion of the tube and bring its walls into contact, reducing said pressure, passing sufficient current thru the compressed portion of the tube to weld the walls and then retracting the electrodes.

3. A machine for sealing an evacuated container with a metal exhaust tube, comprising means for moving said tube in a curve path, a welding electrode adjacent said path normally out of the line of travel of said tube, another welding electrode in registry with the first mentioned electrode and spaced on the opposite side of said path, and means for moving said welding electrodes radially toward said tube at a predetermined point in said path in consonance with the movement of the tube moving means to close and seal said tube.

4. A machine for sealing a metal tube, comprising means for moving said tube in a predetermined path, welding electrodes with registering, welding faces on opposite sides of said path, means for relatively moving said electrodes in consonance with the movement of said tube to pinch and weld said tube, and means for adjusting said electrodes in a direction parallel to the plane of said faces.

5. A machine for sealing a metal tube, comprising means for moving said tube in a predetermined path, welding electrodes with registering, welding faces on opposite sides of said path and each face being spaced from said path, means for successively moving said electrodes toward said path in consonance with the movement of said tube to pinch and weld said tube, and means for preventing short circuits between said electrodes comprising insulating plates on the upper sides of said electrodes.

6. In a machine for sealing a metal tube, means for moving said tube in a predetermined path, cooperating welding electrodes on opposite sides of said path, means for successively advancing said electrodes toward said path to pinch and weld gas-tight said tube, and common actuating means for the first and second mentioned means.

7. In a machine for sealing a metal tube, means for moving said tube in a predetermined path, a welding electrode positioned on one side of said path with positive driving means for reciprocating said electrode, a cooperating electrode on the other side of said path and hydraulic means for advancing the last mentioned electrode toward the other to pinch said tube, at a predetermined point in said path.

8. In a machine for sealing a metal tube, means for moving said tube in a predetermined path, a first welding electrode, means for moving said first electrode normal to said path to bring its welding face to a position just short of the normal center line of said tube, a second welding electrode, means for moving said second electrode toward said first electrode to pinch said tube.

9. In a machine for sealing a metal tube, means for carrying said tube in a predetermined path, welding electrodes positioned in registry and on opposite sides of said path, means to move said electrodes into pinching engagement with said tube, means for sending a welding current between said electrodes with a control circuit comprising a switch operatively controlled by an arm overlying said path.

10. In a welder, a base, a carriage longitudinally slidable upon said base, an electrode supporting member attached to and extending beyond said carriage with the extended portion having a depending arm, an electrode with a welding surface facing upon said carriage attached to said arm, a second electrode in registry with the first mentioned electrode and mounted upon a plunger mounted in said carriage to reciprocate normal to said surface.

CARL HERZOG.